United States Patent [19]

Affolderbach et al.

[11] Patent Number: 5,698,280
[45] Date of Patent: Dec. 16, 1997

[54] HEAT-SHRINKABLE ENVELOPE

[75] Inventors: Ulrich Affolderbach, Wuppertal; Andreas Kupczyk, Hagen; Hans-Juergen Meltsch, Schwerte; Sigrid Rose, Wetter; Wolfgang Schulte, Hagen, all of Germany

[73] Assignee: RXS Kabelgarnituren GmbH, Hagen, Germany

[21] Appl. No.: 754,161

[22] Filed: Nov. 22, 1996

[30] Foreign Application Priority Data

Nov. 29, 1995 [DE] Germany ............ 195 44 539.2

[51] Int. Cl.⁶ .................... B65B 53/02; B65D 65/06
[52] U.S. Cl. ............ 428/34.9; 428/35.2; 428/36.8; 428/192; 428/193; 428/194; 428/212; 428/247; 428/252; 428/349; 428/913; 174/DIG. 8; 285/381.1
[58] Field of Search ................. 428/34.9, 913, 428/252, 247, 255, 193, 192, 194, 198, 346, 68, 212, 36.8, 35.2, 347, 349; 285/381.1, 381.4, 381.5; 174/DIG. 8, 35 R, 84 R

[56] References Cited

U.S. PATENT DOCUMENTS

| 4,631,098 | 12/1986 | Pithouse et al. | 156/86 |
|---|---|---|---|
| 4,929,477 | 5/1990 | Will | 428/34.9 |
| 4,952,437 | 8/1990 | Winterhoff et al. | 428/68 |
| 5,134,000 | 7/1992 | Smyth et al. | 428/34.9 |
| 5,171,617 | 12/1992 | Affolderbach et al. | 428/34.9 |
| 5,302,428 | 4/1994 | Steele et al. | 428/34.9 |
| 5,413,790 | 5/1995 | Koppe et al. | 428/34.9 |
| 5,449,537 | 9/1995 | Pieper et al. | 428/34.9 |

FOREIGN PATENT DOCUMENTS

| 1 497 051 | 1/1978 | European Pat. Off. . |
|---|---|---|
| 0 117 026 | 6/1989 | European Pat. Off. . |
| 0 299 438 | 9/1992 | European Pat. Off. . |
| 0 299 439 | 9/1992 | European Pat. Off. . |
| GM 75 01 913.5 | 4/1975 | Germany . |

*Primary Examiner*—Rena Dye
*Attorney, Agent, or Firm*—Hill, Steadman & Simpson

[57] ABSTRACT

A heat-shrinkable envelope of at least one shrinkable surface layer and a reinforcing insert has the reinforcing insert formed of a grid of plastic, and the grid is shrinkable in the shrink direction of the shrinkable layer.

44 Claims, 2 Drawing Sheets

HEAT-SHRINKABLE ENVELOPE

BACKGROUND OF THE INVENTION

The present invention is directed to a heat-shrinkable envelope composed of at least one shrinkable surface layer and of at least one reinforcing insert.

Heat-shrinkable envelopes are known, which contain the reinforcing inserts for reinforcing the mechanical properties. United Kingdom Patent Specification 1,497,051, which was the basis of German Utility Model GM 75 01 913, discloses an envelope which has only longitudinally-directed reinforcing elements so that the shrink direction of the envelope is not influenced. The result is that the injury to the envelopes, just as, for instance, tears in the longitudinal direction, can progress unimpeded. This is especially dangerous when these injuries occur at the edge of the end face, since a further tearing of the envelope in the longitudinal direction of the envelope as a consequence of the shrinking forces during the shrinking cannot be stopped. In order to solve this problem, woven or knits, for example, have been introduced, such as disclosed by U.S. Pat. No. 4,631,098, whose disclosure is incorporated herein by reference thereto and which claims priority from the same United Kingdom Applications as European Letters Patent 0 117 026. However, the shrinkable fabrics are employed herein and are embedded in a non-shrinkable material. In order to achieve a correspondingly higher mechanical strength, non-shrinkable heat-resistant threads that proceed in a second weave direction are inserted in addition to the shrinkable threads proceeding in the shrink direction. There is the risk of voids along the heat-resistant threads and the longitudinally-directed reinforcing elements.

U.S. Pat. No. 4,929,477, whose disclosure is incorporated herein by reference thereto and which claims priority from the same German Application as EP 0 299 438 B1, discloses a heat-shrinkable envelope with a shrinkable component that is arranged in a non-shrinkable component. This shrinkable component is composed of crosslinked polymers and is fashioned in a net form and stretched. The shrinkable component is joined in a firmly adhering fashion to the non-shrinkable surface of the planar component or layer or is, respectively, embedded therein. In such an embodiment, the shrink forces are exerted exclusively by the shrinkable net, which was fashioned and inserted in net form.

U.S. Pat. No. 4,952,437, whose disclosure is incorporated herein by reference thereto and which claimed priority from the same German Application as European 0 299 439, also discloses a shrinkable envelope composed of at least one heat-shrinkable component and of a mechanical reinforcing component. Here, the shrinkable component is formed of a planar film extending the entire envelope, whereby the shrinkable component is already stretched. The mechanical reinforcing components are brought into a firm union with the shrinkable component so that the mechanical reinforcing component at least comprises reinforcing elements proceeding in the shrink direction. These reinforcing elements are fashioned so that a change in shape corresponding to the shrinkage of the shrinkable component is possible.

SUMMARY OF THE INVENTION

An object of the present invention is to find a heat-shrinkable envelope that is protected against local injuries or tears for use under severe mechanical stresses, that can be manufactured in a simple way and with which high shrinking forces can be achieved. This object is achieved with a heat-shrinkable envelope composed of at least one shrinkable surface layer and at least one reinforcing insert, with the improvement being that the reinforcing insert is formed of a grid of plastic and the grid is shrinkable in a shrink direction of the surface layer.

Advantages of the envelope of the invention compared to the prior art are to be especially seen, since the employment of approximately identical, but respectively appropriately modified materials for the cover layers and the reinforcing inserts produce positive results for all pending problems.

The mutual adhesion can thus be improved by employing shrinkable material for the surface layer to be viewed as a cover layer as well as for the reinforcing insert. No separation in the contact zone thus occurs given such a composite. Also assured as a result of the good adhesion is that the harmful voids or cavities can no longer be formed along the parting surfaces between surface layer and the reinforcing insert, as can be the case, for example, given inserts of glass fibers or Kevlar fibers.

It is also assured that the mechanical loads that lead to tears or other mechanical injuries are largely intercepted by the structure of the reinforcing insert. Given the configuration of the reinforcing insert consisting of crossing grid elements or lattice elements, an injury will only respectively propagate within a grid mesh up to the following grid element. This inhibiting effect occurs due to the transition at material boundary surfaces, so that this effect can be intensified or abated as needed by an appropriate selection of the plastic materials or in their processing.

Good results are thus achieved when the materials are crosslinked to different degrees, so that the reinforcing insert should be the deciding factor in this case. As needed, a reinforcing insert is therefore crosslinked more highly than the surface layer, less than the surface layer or the same as the surface layer on which it is placed on an outside or inside or in which it is embedded. After the crosslinking, the stretching procedure intended for the shrinking procedure thus occurs, whereby the stretching occurs in the direction in which the shrinkage is to later occur. In the manufacture of such a heat-shrinkable envelope, the reinforcing insert and the surface layer can be initially independently processed. The lamination to form a composite then occurs subsequently. In another manufacturing method the individual layers are applied to one another and are then simultaneously subjected to the crosslinking and stretching process as a composite. However, crosslinking of individual layers, such as the surface layer or the reinforcing insert, can also already be undertaken so that the respectively optimum condition can be produced for the respective application. Closure elements, for example closure beads, are applied to or extruded onto the two opposite longitudinal edges of the shrinkable envelope. The stretching direction and, therefore, the shrinking direction as well proceed perpendicular to these closure elements. The surface of the outwardly disposed surface layer is preferably crosslinked in order to render it thermally stable or flame-retardant.

Since each of the layers, whether it is the surface layer or the reinforcing layer, which is formed by the insert, contributes to the shrinking, the shrink properties can also be optimally set given such embodiments. When the principal shrink property is impressed for the reinforcing insert with respect to the material and the processing thereof by crosslinking and stretching, potentially even before the lamination, the difficulties that were also hitherto common are eliminated. Also, those difficulties which occur because of a pass ire reinforcing insert had to be fashioned so that it did not impede the shrinking of the shrink layer are eliminated. Crosslinking accelerants, such as, for example, triallylcyanurate (TAC) can also be introduced into what is referred to as the shrink compound for controlling the additional crosslinking.

The above advantages occur given the employment of reinforcing inserts in the form of a grid or lattice of plastic having the properties as already explained above. This grid can be produced by crossing grid elements, wherein the elongated grid elements can comprise the greatest variety of cross sections as well as different thicknesses or diameters. The grid elements having cross sectional shapes, such as circular, oval, rectangular, quadratic, rhomboid or polygonal, for example a six-sided cross section, can be employed. The grid elements can be joined to one another with firm adhesion in the intersection (non-positively) or can form loose intersections. The connection of the intersections can be produced, for example, by gluing, welding or pinching. In addition, a grid or lattice structure in the sense of the invention can be achieved when a plurality of holes are introduced into a surface layer of shrinkable material in a regular or irregular distribution. In this situation, the individual grid elements are formed that correspond to the elongated grid elements of a grid produced by individual grid elements.

The shrinkable grid or lattice as a reinforcing insert is joined with firm adhesion to the shrinkable surface layer or layers so that their shrink directions act in the same direction. However, a plurality of reinforcing inserts can also be incorporated into the composite on top of one another, wherein these reinforcing inserts are then arranged isodirectionally or offset by an angle. In this latter embodiment, the two reinforcing inserts are then introduced so that the resulting shrink direction of the individual reinforcing inserts proceeds in the same direction as the shrink direction for the surface layer.

Given a composite of the invention, the shrink values as well as the mechanical values can also be determined in that the material thickness of the individual layers or, respectively, reinforcing inserts are matched to one another. The individual layers can thus be fashioned of the same thickness or different thicknesses. Given a pure grid form for the reinforcing insert, the grid elements running in the shrink direction can, for example, be fashioned thicker than the grid elements running transversely thereto, since the elements running transversely to the shrink direction make no contribution to the shrinking, but are mechanically important for preventing or, respectively, limiting damage due to mechanical loading.

As needed, additional reinforcing elements, such as glass fibers, Kevlar threads, cotton threads or other materials that cannot be crosslinked or are difficult to crosslink, such as, for example, polypropylene, can be embedded in the surface layer in a transverse direction and/or in a longitudinal direction, and these additional reinforcing elements are then affected by the above-mentioned problems. Termite-resistant additives can also be mixed into at least one of the surface layers. The following configurations are preferred for the construction of the composite for a shrinkable envelope of the invention:

Strong or thick outer, shrinkable surface layer with a shrinkable reinforcing insert applied on the inside, whereby the grid meshes or, respectively, holes of the reinforcing insert are filled with filler material, for example thermoplastics, thermoplastic elastomers, rubber-elastic mixtures or blends thereof.

Two shrinkable surface layers between which the reinforcing insert is embedded, and the grid mesh or holes of the reinforcing insert are filled with a filler material.

Outer shrinkable surface layer with an inner surface layer that extends into the grid mesh or, respectively, holes of the intervening reinforcing insert.

Outer shrinkable surface layer that extends into the grid mesh or, respectively, holes of the reinforcing insert and an inner shrinkable surface layer.

Additional layers can be applied in these exemplary embodiments, for instance for stabilizing the outer surface to prevent flowing or, respectively, dripping, given the application of heat, for thermo-indication and other reasons.

The filler material for the mesh or, respectively, hole region of the grid-shaped reinforcing inserts can be stretchable, crosslinkable or rubber-elastic material. Swellable plastic materials, which are notoriously known in plastic processing, are also suitable for the filler material. The filler material can also expediently comprise additional properties and serves, for example, as temperature filter or, respectively, temperature limiter with a corresponding temperature barrier effect. Gel-like material, for example silicone or polyurethane, can also be employed for the filler material, since it can be quickly warmed through and is flexible given slight thicknesses and thereby nonetheless comprises adequate mechanical strength. It can likewise be utilized as a temperature filter or, respectively, temperature limiter with a temperature barrier effect. In addition, rubber-elastic material can also be employed as a filler material, since it can be easily shaped or deformed during the shrinking process.

It is also part of the invention that the basic composite of the invention for a heat-shrinkable envelope is equipped with appropriate optical displays for adequate tempering during the shrinking process. For example, the outer surface of the composite can thus be provided with a known thermochromic reversing color, whose appearance changes given adequate application of heat.

The outer layer or a separate layer as well can be composed of a transparent plastic through which a grid-like reinforcing element can be seen. If the reinforcing insert is composed of a material, for example, which will change in color given adequate application of heat, then the end of the shrinking process can be recognized directly at the corresponding location.

Given the grid-like embodiment of individual, crossing grid elements, the intersections of the grid can be fashioned so that the dilation occurs during the shrinking process and hub-like exterior structure or bumpy exterior surface will occur. This structure then indicates that adequate heat penetration has occurred at the rated temperature.

Similar effects can be produced when the material-compatible filler or filler of compatible material between the grid meshes or, respectively, holes of the grid-like reinforcing insert is composed of a material that swells when heated. The effects then likewise lead to a structure surface.

An outer cover layer can also be employed that is not initially transparent and only becomes transparent given an appropriate application of heat, so that the indicator layer of the surface layer lying therebelow becomes visible.

Given envelopes having a longitudinally proceeding slot and longitudinally proceeding closure elements, the slot region must be covered by what is referred to as an underflap for purposes of sealing, and this is advantageously fashioned on the envelope as a continuation. It then lies at hand that the reinforcing insert is conducted beyond a long edge of the envelope as a continuation so that this extension longitudinally covers the slot proceeding from the inside. A carrier composite composed of the grid and a filler or, respectively, surface layer is then to be expediently manufactured, therefore, in order to close the grid mesh or, respectively, holes of the reinforcing insert.

Moreover, the grid mesh or, respectively, the holes in the reinforcing insert creates space for glue reserves, particularly in the underflap region, so that a reliable gluing and sealing of the slot region as well as the inside coating can be obtained. The advantage is thereby that less adhesive is pressed out during shrinking, since glue reserves remain, and that a reduction of shrink forces and a uniform distribution of the shrink forces on the envelope article, for example a cable, is established.

Other advantages and features of the invention will be readily apparent from the following description of the preferred embodiments, the drawings and claims.

DESCRIPTION OF THE PREFERRED EMBODIMENTS

Figure 16:
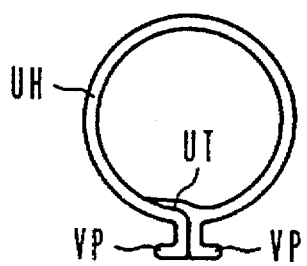
FIG. 16 is an end view of the envelope in a closed condition in accordance with the present invention.

The principles of the present invention are particularly useful when incorporated in a shrinkable envelope UH, which can be closed around an object, such as illustrated in FIG. 16.

Figure 1:
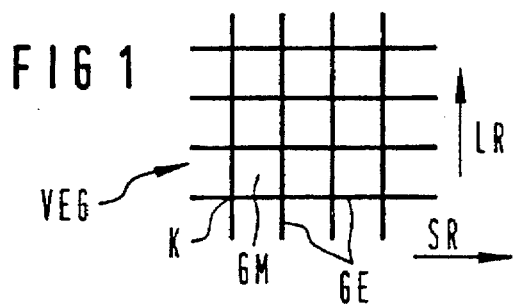
FIG. 1 is a diagrammatic view showing a basic structure of a grid-shaped reinforcing insert with quadratic grid meshes.

As illustrated in FIG. 1, a reinforcing insert VEG, which is used in the envelope, such as UH, is fashioned as a grid. This structure is shown composed of individual grid elements GE crossing in an intersection K, wherein a quadratic grid mesh GM is formed. The reinforcing insert VEG is shrinkable in a shrink direction SR and is unshrinkable in a longitudinal direction LR, which is the axial direction of the envelope, such as UH of FIG. 16. The stretching of the reinforcing insert VEG with or without a composite that effects the shrinking occurs previously along the direction SR.

Figure 2:
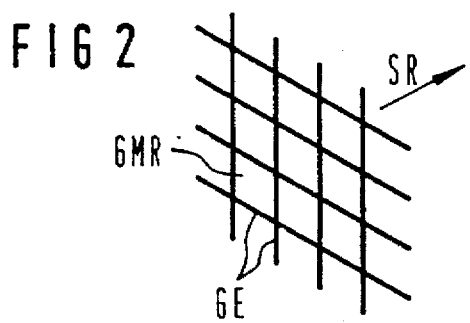
FIG. 2 is a diagrammatic view showing a basic structure of a grid-shaped reinforcing insert with rhombic grid meshes.

A grid-shaped reinforcing insert, which is composed of grid elements GE, can be arranged to have a rhombic grid mesh formation GMR, as illustrated in FIG. 2. The grid-shaped reinforcing insert with equal or unequal grid meshes can also be utilized offset relative to one another.

Figure 3:
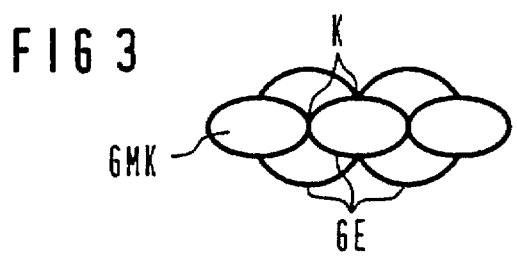
FIG. 3 is a diagrammatic view showing a basic structure of a grid-shaped reinforcing insert with oval grid meshes.

A variation of a reinforcing insert is shown in FIG. 3, and it has nearly circular or, respectively, oval grid meshes GMK between the grid elements. Only circular grid elements can also be joined to one another in this sense. A superimposition of a plurality of the grid shapes can also be selected.

Figure 4:
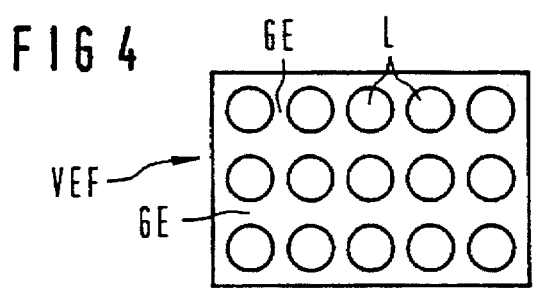
FIG. 4 is a plan view of a reinforcing insert composed of a surface layer with holes introduced therein to form a reinforcing insert.

Instead of forming the reinforcing element out of grid elements, in FIG. 4, a surface layer, which is shrinkable in one direction, is formed as a reinforcing insert VEF. The surface layer has a plurality of holes L introduced in a regular arrangement so that a quasi-grid is formed here. However, the arrangement of the holes can be fashioned non-uniform or with other shapes or forms, for example in polygonal form as wee The material well. located between the individual holes L thus correspond to the above-described grid elements GE so that the same condition will apply in this arrangement as in the inserts of FIGS. 1, 2 or 3.

Figure 5:
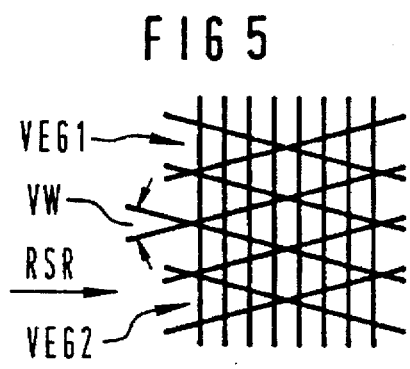
FIG. 5 is a diagrammatical view showing an arrangement of two grid-shaped reinforcing inserts which are offset at an angle relative to one another.

The reinforcing inserts can be formed by two reinforcing inserts VEG1 and VEG2, as shown in FIG. 5, which have been offset relative to one another by an offset angle VW with respect to their shrink direction. Thus, a resultant shrink direction RSR is formed by the two inserts VEG1 and VEG2. The two reinforcing inserts within the overall composite thus form a distribution and, thus, a reduction of stresses in the material given a potential tear or cut.

Figure 6:
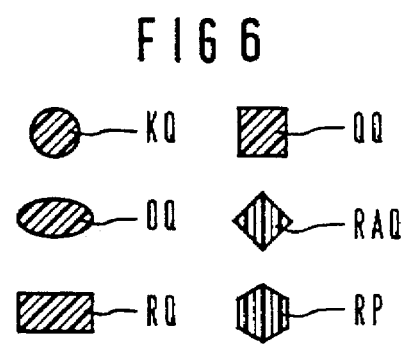
FIG. 6 shows various cross sections of individual grid elements which can be used in forming the grid-shaped reinforcing insert, such as in FIG. 1.

Each of the elements, such as GE, forming the grids of FIGS. 1, 2 and 3 can have different cross sections. For example, the grid elements GE can have a circular cross section KQ (as shown in FIG. 6), an oval cross section OQ, a rectangular cross section RQ, a square cross section QQ or a rhomboid cross section RAQ. In addition, an element with a polygon cross section, such as a six-sided element RP, can be used.

A composite for the envelope comprising at least one reinforcing insert and at least one surface layer are illustrated in FIGS. 7–11.

Figure 7:
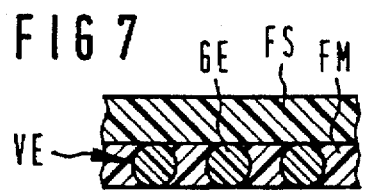
FIG. 7 is a partial cross sectional view of an envelope having an outer shrinkable surface and an internal reinforcing element.

As shown in FIG. 7, an outer shrinkable surface layer FS has an inside surface with a shrinkable reinforcing insert VE secured thereon. The meshes or openings of the insert VE are filled with a filler FM.

Figure 8:
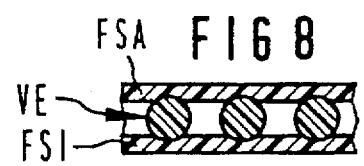
FIG. 8 is a partial cross sectional view showing a modification of the envelope of the present invention with a reinforcing element interposed between two surface layers.

A second embodiment of the composite is illustrated in FIG. 8. This embodiment has a shrinking reinforcing insert VE, which is arranged between an outer surface layer FSA and an inner surface layer FSI. While not illustrated, a filling material could also fill the gaps or openings between the individual elements forming the insert VE.

Figure 9:
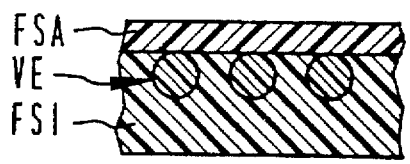
FIG. 9 is a partial cross sectional view of a third embodiment of an envelope having a composite with an outer surface layer engaged on an inner surface layer in which the reinforcing grid is embedded.

In FIG. 9, a third embodiment wherein the shrinkable reinforcing insert VE is embedded in an inner layer FSI is illustrated. The inner surface layer FSI is then joined to an outer surface layer FSA with a firm adhesion. The grid meshes or, respectively, holes of the reinforcing insert are filed with the material of the inner surface layer FSI.

Figure 10:
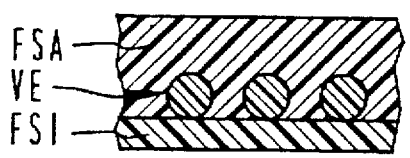
FIG. 10 is a fourth embodiment of an envelope having a composite with an outer surface layer with an embedded reinforcing grid disposed on an inner surface layer.
Figure 14:
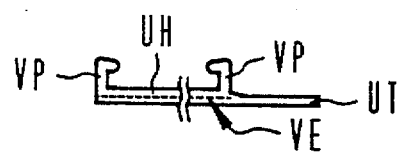
FIG. 14 is an end view of an envelope illustrating the closure profile.

In a fourth embodiment illustrated in FIG. 10, a shrinkable reinforcing insert VE is embedded in the outer surface layer FSA so that the grid meshes or holes of the reinforcing insert are filled with the material of this surface layer FSA. An inner surface layer FSI is applied on an inner surface of the outer surface layer FSA so as to have the grid VE interposed therebetween.

Figure 11:
FIG. 11 is a cross sectional view of a fifth embodiment, wherein the reinforcing insert is embedded in a single layer of the envelope.

In each of the embodiments illustrated in FIGS. 9 and 10, the grid or insert VE is embedded, but not completely surrounded by the layer in which it is embedded. In FIG. 11, the shrinkable reinforcing insert VE is embedded in a single surface layer FS in the simplest form and, as illustrated, is completely surrounded by the material of the layer FS.

Figure 12:
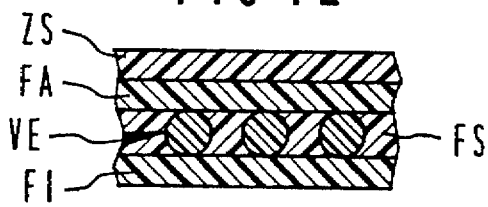
FIG. 12 is a cross sectional view of a composite envelope having an auxiliary layer.

The basic composite of the envelope, which is illustrated in FIG. 12, comprises an inner surface layer FI, an insert embedded in the layer FS, and an outer layer FA, which has an auxiliary layer ZS. The auxiliary layer ZS is provided for additional purposes. For example, the auxiliary layer ZS can serve as an optical display with which an indication is made whether or, respectively, when enough heat has been applied for the shrinking process. In such an arrangement, the auxiliary layer ZS is composed of, for example, thermochromic reversing colors.

Figure 13:
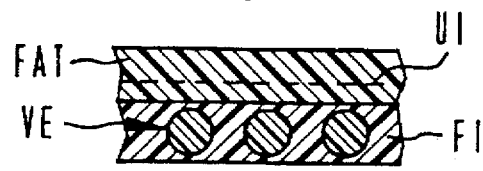
FIG. 13 is a cross sectional view of an envelope with an indicator display that becomes optically visible.

Instead of providing a layer ZS, the composite illustrated in FIG. 13 has a reversing indicator UI that, for example, changes in color and is embedded into an outer surface layer FAT, which is a transparent material. This layer FAT is disposed on an inner layer FI, in which the reinforcing insert VE has been embedded.

The envelope UH has its longitudinally proceeding edges provided with closure profiles VP, with which the longitudinal edges can be held together in a closed condition after enveloping an article. To hold the closure profiles VP together, a C-shaped closure rail is pulled thereon in a manner disclosed, for example, in the above-mentioned U.S. Pat. No. 4,952,537. In addition to the closure profiles, the overall composite envelope UH contains an embedded, shrinkable reinforcing insert VE. It also has a continuation UT that is provided as an underflap or covering of the closing region and is fashioned along one longitudinal edge of the envelope.

Figure 15:
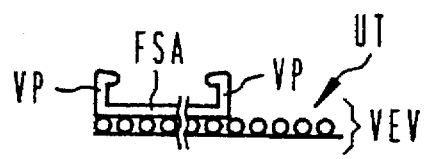
FIG. 15 is an end view of a closure profile with a reinforcing insert fashioned as a composite.

In FIG. 15, the grid-shaped reinforcing insert VEV is employed as a separate composite. For example, the grid-shaped reinforcing insert is provided with a surface layer at least in the region of the underflap UT, so that the grid mesh or, respectively, holes are sealed. A filling between the grid composite VEV and the outer surface layer VSA occurs as shown in FIGS. 7-13.

The envelope UH of the invention is in a closed condition, as illustrated in FIG. 16. It becomes clear that the two closure profiles VP are brought together for closing and are held together by a closure rail (not shown). The under flap UT covers the longitudinal closure in a sealing fashion in the closing region. The seal is accomplished with the assistance of a coat of hot-melt adhesive that can be applied to the inside of the envelope.

In addition, reinforcing inserts can be produced as an injected or punched part. However, a grid-shaped structure of grid elements contacting in a plane are also conceivable, as obtained with "zig-zag" elements which are joined to one another.

The crosslinking can occur either by high-energy irradiation or by peroxidic or chemical additives, for example hydrosilicon. A combination of both methods for crosslinking is also possible. For example, the known hydrosilicon crosslinking can thus be implemented.

The following materials are included among those suitable for the heat-shrinkable envelope. These materials are capable of being employed both for the surface layer as well as for the reinforcing insert. These materials are selected from a group consisting of high-density polyethylene (HDPE); low-density polyethylene (LDPE); linear low-density polyethylene (LLDPE); linear low-density polyethylene (LLDPE) with ethylene copolymer/terpolymer; compounds of HDPE/LDPE/LLDPE; and compounds of ethylene copolymer/terpolymer.

Although various minor modifications may be suggested by those versed in the art, it should be understood that we wish to embody within the scope of the patent granted hereon all such modifications as reasonably and properly come within the scope of our contribution to the art.

We claim:

1. A heat-shrinkable envelope comprising at least one shrinkable surface layer being shrinkable in a shrink direction and at least one reinforcing insert being in the shrinkable surface layer, the envelope having longitudinal edges having closure elements extending transverse to the shrink direction of the surface layer and an underflap extending beyond one of the closure elements, said reinforcing insert extending beyond said one closure element and into the underflap, said reinforcing insert being formed of a grid of crossing plastic grid elements with the grid elements extending in the shrink direction of the surface layer being shrinkable and the grid elements extending transverse relative to the shrink direction being of a non-shrinkable material.

2. A heat-shrinkable envelope according to claim 1, wherein the grid elements are connected firmly adhering to one another in intersections, at least in the fabricated condition of the envelope, said grid elements being connected by one of a group selected from welding, gluing and pinching.

3. A heat-shrinkable envelope according to claim 1, wherein the grid elements are loosely arranged above one another in the intersections of the grid structure.

4. A heat-shrinkable envelope according to claim 1, wherein the grid elements form a rectangular net mesh.

5. A heat-shrinkable envelope according to claim 1, wherein the grid elements form a mesh having rhomboid openings to form a rhomboid net mesh.

6. A heat-shrinkable envelope according to claim 1, wherein the insert is formed by grid elements forming nearly circular grid meshes.

7. A heat-shrinkable envelope according to claim 1, wherein the insert is formed by grid elements forming nearly oval-shaped net meshes.

8. A heat-shrinkable envelope according to claim 1, wherein the reinforcing insert is formed by a mat fashioned as injected or punched parts.

9. A heat-shrinkable envelope according to claim 1, wherein the reinforcing insert is a layer having a grid structure formed by a plurality of holes extending through the layer.

10. A heat-shrinkable envelope according to claim 1, wherein at least two reinforcing inserts are arranged one over the other.

11. A heat-shrinkable envelope according to claim 10, wherein the reinforcing inserts are offset relative to one another by an offset angle with respect to their shrink directions.

12. A heat-shrinkable envelope according to claim 1, wherein a reinforcing insert is formed of grid elements which have the same strength in the shrink direction and in the transverse direction.

13. A heat-shrinkable envelope according to claim 1, wherein the reinforcing insert is formed of grid elements having different strengths in the shrink direction and in a transverse direction to the shrink direction, with the strength in the shrink direction being greater than the strength in the transverse direction.

14. A heat-shrinkable envelope according to claim 1, wherein the reinforcing insert is formed of grid elements, which are arranged in the shrink direction and in a transverse direction to the shrink direction and are composed of the same plastic material.

15. A heat-shrinkable envelope according to claim 1, wherein the reinforcing insert is formed of first grid elements arranged in the shrink direction and second grid elements extending transverse to the shrink direction, said first elements being composed of different plastic materials than the second grid elements.

16. A heat-shrinkable envelope according to claim 1, wherein the reinforcing insert is formed of grid elements which proceed in the shrink direction being crosslinked to a different degree than the grid elements extending transverse to the shrink direction.

17. A heat-shrinkable envelope according to claim 1, wherein a surface layer is more highly crosslinked than the reinforcing insert.

18. A heat-shrinkable envelope according to claim 1, wherein the surface layer is crosslinked to a lesser degree than the reinforcing insert.

19. A heat-shrinkable envelope according to claim 1, wherein the surface layer and the reinforcing insert are crosslinked to the same degree.

20. A heat-shrinkable envelope according to claim 1, wherein the materials for the surface layer and the reinforcing insert are laced with crosslinking accelerator triallylcyanurate.

21. A heat-shrinkable envelope according to claim 1, wherein the overall composite of the surface layer and reinforcing insert are crosslinked and stretched.

22. A heat-shrinkable envelope according to claim 1, wherein the surface layer and the reinforcing insert are separately crosslinked and stretched before being laminated together.

23. A heat-shrinkable envelope according to claim 1, wherein the reinforcing insert is embedded between two surface layers.

24. A heat-shrinkable envelope according to claim 1, wherein the reinforcing insert has grid meshes filled with a filler of compatible material.

25. A heat-shrinkable envelope according to claim 24, wherein the filler is provided with a swelling agent reacting to the application of heat so that a bumpy surface occurs when the rated temperature is reached.

26. A heat-shrinkable envelope according to claim 1, wherein a surface of an externally-disposed surface layer is highly stabilized to be shape-stable against dripping under the application of heat.

27. A heat-shrinkable envelope according to claim 1, wherein a surface of an externally-disposed surface layer contains a flame-resistant additive.

28. A heat-shrinkable envelope according to claim 1, which includes a termite-resistant additive being added to at least one of the surface layers.

29. A heat-shrinkable envelope according to claim 1, wherein a thermo-indicator, which preferably changes color and/or shape when a rated temperature is reached, is arranged on a surface of an externally-disposed surface layer of the envelope.

30. A heat-shrinkable envelope according to claim 29, wherein an outer surface layer is transparent before shrinking.

31. A heat-shrinkable envelope according to claim 29, wherein an outer surface layer becomes transparent after shrinking.

32. A heat-shrinkable envelope according to claim 29, wherein the outer surface layer is transparent and a reinforcing insert is embedded therein and is formed of a material that changes color when the rated temperature is reached.

33. A heat-shrinkable envelope according to claim 1, wherein the reinforcing insert swells in the intersections when the rated temperature is reached so that the surface of the outer surface layer exhibits a bumpy structure.

34. A heat-shrinkable envelope according to claim 1, which includes non-shrinking auxiliary elements selected from glass threads, Kevlar threads, cotton threads and threads of non-crosslinkable material being arranged in a transverse direction to the direction of shrinking.

35. A heat-shrinkable envelope according to claim 1, wherein at least the reinforcing insert is manufactured of a material selected from a group consisting of a high-density polyethylene, a low-density polyethylene, a linear low-density polyethylene, a compound of a high-density polyethylene/low-density polyethylene/linear low-density polyethylene and a compound of ethylene copolymer/terpolymers.

36. A heat-shrinkable envelope according to claim 1, wherein at least the surface layer is manufactured of a material selected from a group consisting of a high-density polyethylene, a low-density polyethylene, a linear low-density polyethylene, a compound of a high-density polyethylene/low-density polyethylene/linear low-density polyethylene and a compound of ethylene copolymer/terpolymers.

37. A heat-shrinkable envelope according to claim 1, wherein both the reinforcing insert and the surface layer are manufactured of a material selected from a group consisting of a high-density polyethylene, a low-density polyethylene, a linear low-density polyethylene, a compound of a high-density polyethylene/low-density polyethylene/linear low-density polyethylene and a compound of ethylene copolymer/terpolymers.

38. A heat-shrinkable envelope according to claim 1, wherein the reinforcing insert is composed of a rubber-elastic material.

39. A heat-shrinkable envelope according to claim 1, wherein the reinforcing insert is composed of a thermoplastic elastomer.

40. A heat-shrinkable envelope according to claim 1, wherein the reinforcing insert is composed of thermoplastics.

41. A heat-shrinkable envelope according to claim 1, wherein the material of the reinforcing insert is selected to be crosslinkable by a process selected from a group consisting of hydrosilicon crosslinkable, peroxidically crosslinkable and radiation crosslinkable and combinations thereof.

42. A heat-shrinkable envelope according to claim 1, wherein the reinforcing insert is composed of a swellable material that acts as a temperature barrier and fire protection.

43. A heat-shrinkable material according to claim 1, wherein the reinforcing insert is composed of a linear low-density polyethylene with ethylene copolymer-terpolymer.

44. A heat shrinkable envelope comprising at least one shrinkable surface layer and at least one reinforcing insert, said reinforcing insert being formed of a grid of plastic and being shrinkable in a shrink direction of the surface layer, said reinforcing insert being arranged on a carrier layer that extends beyond a longitudinal edge of the envelope and forms an underflap.

* * * * *